United States Patent
Muhoberac et al.

(10) Patent No.: US 10,530,255 B2
(45) Date of Patent: Jan. 7, 2020

(54) PEAK CURRENT CONTROL FOR A POWER SWITCH OF A POWER CONVERTER

(71) Applicant: Dialog Semiconductor (UK) Limited, London (GB)

(72) Inventors: Ivan Muhoberac, Graz (AT); Frank Trautmann, Munich (DE)

(73) Assignee: Dialog Semiconductor (UK) Limited, London (GB)

(*) Notice: Subject to any disclaimer, the term of this patent is extended or adjusted under 35 U.S.C. 154(b) by 0 days.

(21) Appl. No.: 16/014,651

(22) Filed: Jun. 21, 2018

(65) Prior Publication Data

US 2018/0375435 A1 Dec. 27, 2018

(30) Foreign Application Priority Data

Jun. 22, 2017 (DE) .......... 10 2017 210 507

(51) Int. Cl.
*H02M 3/158* (2006.01)
*G05F 1/575* (2006.01)
*H02M 1/00* (2006.01)

(52) U.S. Cl.
CPC .......... *H02M 3/1582* (2013.01); *G05F 1/575* (2013.01); *H02M 3/158* (2013.01); *H02M 2001/0029* (2013.01)

(58) Field of Classification Search
CPC .. H02M 3/1582; H02M 3/33523; G05F 1/575
See application file for complete search history.

(56) References Cited

U.S. PATENT DOCUMENTS

| 2009/0174379 A1 | 7/2009 | Lima et al. |
| 2011/0115458 A1 | 5/2011 | Schafmeister et al. |
| 2013/0293211 A1* | 11/2013 | Chen ............... H02M 3/1588 323/282 |
| 2014/0306680 A1 | 10/2014 | Liu et al. |
| 2016/0006336 A1 | 1/2016 | Bennett et al. |

OTHER PUBLICATIONS

German Office Action, File No. 10 2017 210 507.0, Applicant: Dialog Semiconductor (UK) Limited, dated Jul. 11, 2018, 6 pages, and English language translation, 6 pages.
"Switching Power Supplies A-Z," Second Edition, by Sanjaya Maniktala, Copyright 2012 Elsevier Ltd, ISBN: 978-0-12-386533-5, Chapter 12, pp. 495-504, and Chapter 19, pp. 703-707.

* cited by examiner

*Primary Examiner* — Jue Zhang
(74) *Attorney, Agent, or Firm* — Saile Ackerman LLC; Stephen B. Ackerman

(57) ABSTRACT

Control circuitry for controlling the duty cycle of a magnetizing switch of a power converter containing a demagnetizing switch is described. The magnetizing switch and the demagnetizing switch are switched on within a sequence of commutation cycles in a mutually exclusive manner. The control circuitry is configured, within a commutation cycle from the sequence of commutation cycles, to determine a sensed current signal indicative of a current through the magnetizing switch. The control circuitry determines a ramp signal by adding a slope compensation signal to the sensed current signal. The control circuitry determines a threshold signal and determines a duty cycle for the magnetizing switch for the commutation cycle by comparing the ramp signal with the threshold signal. The threshold signal and/or the slope compensation signal depend on the duty cycle for the magnetizing switch of a preceding commutation cycle from the sequence of commutation cycles.

28 Claims, 5 Drawing Sheets

PEAK CURRENT CONTROL FOR A POWER SWITCH OF A POWER CONVERTER

TECHNICAL FIELD

The present document relates to the control of a power switch of a power converter, notably of a power switch of a switched-mode power converter.

BACKGROUND

A switched-mode power converter typically comprises a high side (HS) switch and a low side (LS) switch which are arranged in series between a HS potential and a LS potential. The HS switch and the LS switch are closed in a mutually exclusive manner, in order to couple the midpoint between the HS switch and the LS switch to the HS voltage or to the LS voltage in a mutually exclusive manner.

The duty cycle of the HS switch may be adapted in order to regulate the output voltage of the power converter in accordance to a target voltage. In a so called peak current mode, the duty cycle may be controlled in dependence of the current through the HS switch (which typically corresponds to the current through an inductor of the power converter).

SUMMARY

The present document addresses the technical problem of improving the quality and the precision of a current mode control (CMC) scheme for a power switch, notably for a power switch of a switched-mode power converter. According to an aspect, control circuitry for controlling the duty cycle of a magnetizing switch (e.g. a high side switch) of a power converter comprising also a demagnetizing switch (e.g. low side switch) is described. The magnetizing switch and the demagnetizing switch are switched on within a sequence of commutation cycles in a mutually exclusive manner. The control circuitry is configured, within a commutation cycle from the sequence of commutation cycles, to determine a sensed current signal indicative of a current through the magnetizing switch; to determine a ramp signal by adding a slope compensation signal to the sensed current signal; to determine a threshold signal; and to determine a duty cycle for the magnetizing switch for the commutation cycle by comparing the ramp signal with the threshold signal. The threshold signal and/or the slope compensation signal depend on the duty cycle for the magnetizing switch of a preceding commutation cycle from the sequence of commutation cycles.

According to a further aspect, a method for controlling the duty cycle of a magnetizing switch of a power converter comprising also a demagnetizing switch. The method comprises, within a commutation cycle from the sequence of commutation cycles, determining a sensed current signal indicative of a current through the magnetizing switch; determining a ramp signal by adding a slope compensation signal to the sensed current signal; determining a threshold signal; and determining a duty cycle for the magnetizing switch for the commutation cycle by comparing the ramp signal with the threshold signal. The threshold signal and/or the slope compensation signal depend on the duty cycle for the magnetizing switch of a preceding commutation cycle from the sequence of commutation cycles.

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on the processor.

According to a further aspect, a computer program product is described. The computer program may comprise executable instructions for performing the method steps outlined in the present document when executed on a computer.

It should be noted that the methods and systems including its preferred embodiments as outlined in the present document may be used stand-alone or in combination with the other methods and systems disclosed in this document. Furthermore, all aspects of the methods and systems outlined in the present document may be arbitrarily combined. In particular, the features of the claims may be combined with one another in an arbitrary manner.

BRIEF DESCRIPTION OF THE DRAWINGS

The invention is explained below in an exemplary manner with reference to the accompanying drawings, wherein.

DESCRIPTION

Figure 1:
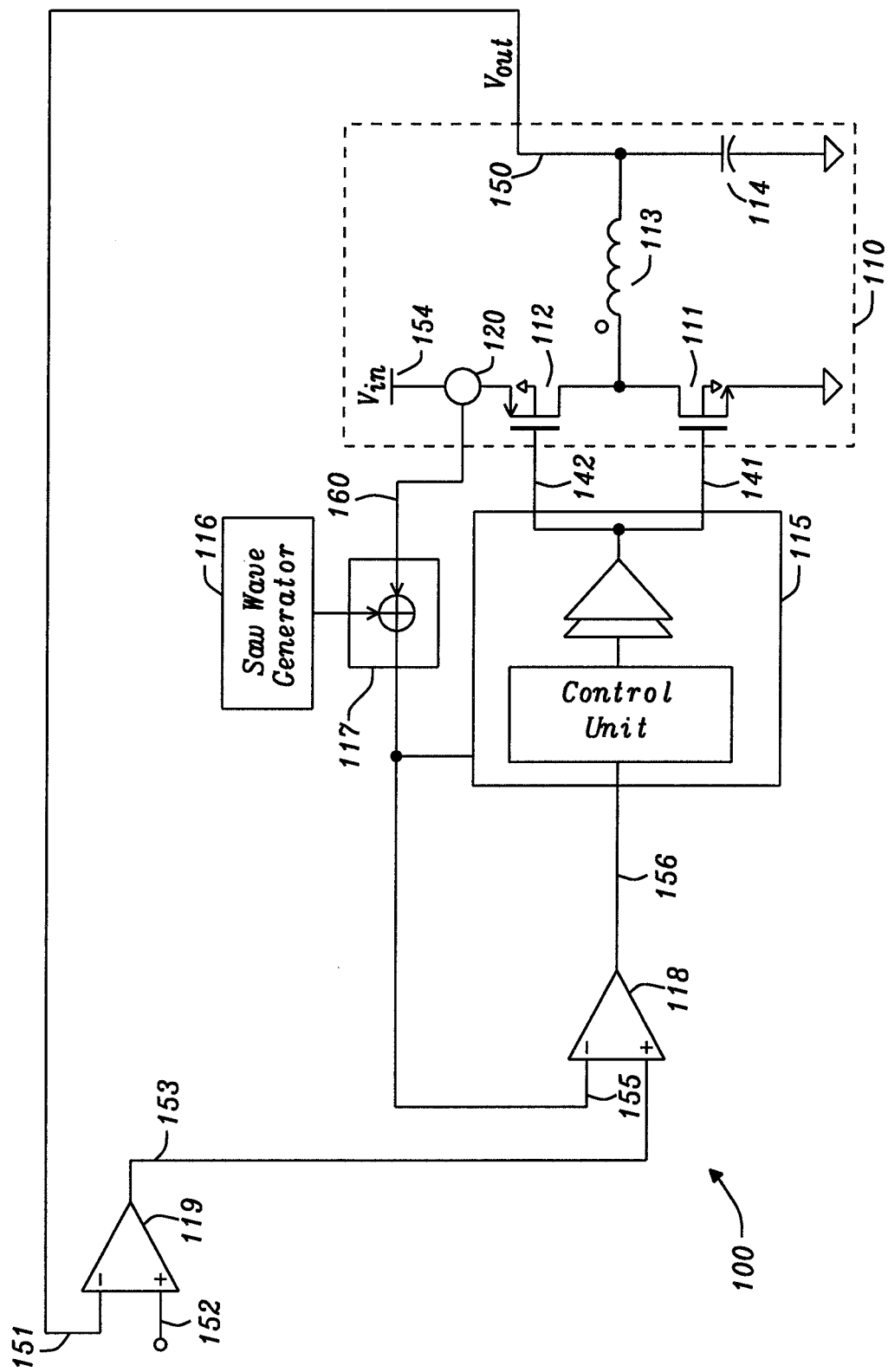
FIG. 1 illustrates a circuit diagram of an example DC-to-DC power converter with a PWM controlled loop.

As indicated above, the present document is directed at providing an improved current mode control scheme for a switched-mode power converter. In this context, FIG. 1 shows a system 100 (notably a regulated switched-mode power converter 100) comprising a buck converter 110, wherein the system 100 comprises a PWM controlled loop for setting the switching times and/or the duty cycles of the power switches 111, 112 of the buck converter 110. It should be noted that even though the following aspects are described in the context of a buck converter 110, the aspects are also applicable to other switched-mode power converters and/or DC-to-DC power converters, e.g. to other DC-to-DC step-down converters or DC-to-DC step-up converters, and to other systems 100 comprising a serial arrangement or half bridge of switches 111, 112 which are closed periodically in a mutually exclusive manner.

The following aspects are discussed in the context of a high side switch 112 and a low side switch 111 of a buck converter. The high side switch 112 may be used to magnetize the inductor 113 of the buck converter any may therefore be referred to more generally as a magnetizing switch. On the other hand, the low side switch 112 may be used to demagnetize the inductor 113 of the buck converter any may therefore be referred to more generally as a demagnetizing switch. The magnetizing switch 112 and the demagnetizing switch 111 may be arranged in series. A midpoint between the magnetizing switch 112 and the demagnetizing switch 111 may be coupled to the inductor 113. The following aspects described for a high side switch 112 are also applicable to a magnetizing switch in general. Furthermore, the following aspects described for a low side switch 111 are also applicable to a demagnetizing switch in general.

The magnetizing switch 112 may be a high side switch (e.g. within a buck converter) or may be a low side switch (e.g. within a boost converter). On the other hand, the demagnetizing switch 112 may be a low side switch (e.g. within a buck converter) or may be a high side switch (e.g. within a boost converter). The demagnetizing switch 112 may be a passive switch, such as a diode. The switches 112, 111 may be metaloxide semiconductor (MOS) based switches (e.g. transistors).

The following aspects a described for a half bridge. It should be noted that the following aspects are applicable to any serial arrangement of a magnetizing switch 112 and a demagnetizing switch 111 (e.g. within a half bridge or within a full bridge).

The buck converter 110 comprises a high side (HS) switch 112 (e.g. a PMOS transistor) and a low side (LS) switch 111 (e.g. a NMOS transistor), as well as an inductor 113 and a capacitor 114. The duty cycle of the buck converter 110 (i.e. the duty cycle of the high side switch 112) is controlled via a feedback voltage $V_{fb}$ 151 which is equal to (or proportional to) the output voltage $V_{out}$ 150. The feedback voltage 151 may be derived from the output voltage 150 using a voltage divider (not shown in FIG. 1). The feedback voltage $V_{fb}$ 151 is compared to a target voltage 152 using e.g. an error amplifier 119, thereby providing a (cumulated or integrated) error voltage $V_{error}$ 153 (also referred to herein as a threshold voltage or a threshold signal). In stable operation, when the output voltage $V_{out}$ 150 corresponds to the desired output voltage of the system 100, the error voltage $V_{error}$ 153 should approximate zero or should take on a pre-determined default error value which may be tuned using the target voltage 152. However, in case of load transients, the output voltage $V_{out}$ 150 may dip or peak, thereby causing the error voltage $V_{error}$ 153 to take on absolute values greater than zero or low than zero.

Overall, the error voltage $V_{error}$ 153 may be used to regulate the output voltage $V_{out}$ 150 which is provided by the system 100. The regulation of the output voltage $V_{out}$ 150 may be achieved by controlling the duty cycle of the high side switch 112. This duty cycle may be controlled using the error voltage $V_{error}$ 153. For example, the error voltage $V_{error}$ 153 may be compared with a saw wave voltage 155 (also referred to herein as a ramp signal) having a pre-determined cycle length. The cycle length typically corresponds to the length of the commutation cycle of the buck converter 110 (i.e. the combined length of an on-state and a succeeding off-state of the high side switch 112). The saw wave voltage 155 typically has a maximum voltage $V_{saw}$ at the peak of each saw tooth. The saw wave voltage 155 is compared to the error voltage $V_{error}$ 153 using comparator 118 (e.g. a hysteretic comparator), thereby generating a pulse width modulated (PWM) control signal 156 which is negative (or zero) when the saw wave voltage 155 is greater than $V_{error}$ 153, and which is positive when the saw wave voltage 155 is smaller than $V_{error}$ 153. The transition from negative to positive (i.e. an edge of the PWM control signal 156) may be taken as a trigger for the duty cycle. In particular, the PWM (pulse width modulated) control signal 156 generated by the comparator 118 may be used by the buck control unit 115 to generate the drive signals for the high side switch 112 and for the low side switch 111 of the buck converter 110. The regulator may be tuned by selecting the maximum voltage $V_{saw}$ of the saw wave voltage 155 (and/or the slope of the saw teeth) and the target voltage $V_{ref}$ 152 based on the input voltage $V_{in}$ 154 and the desired output voltage 150.

The regulation of the duty cycle of the buck converter 110 can be enhanced by also taking into account the inductor current, i.e. the current through the inductor 113 of the buck converter 110. For this purpose, the system 100 may comprise current sensing means 120 for sensing the current through the high side switch 112 (which corresponds to the inductor current when the high side switch 112 is in on-state). The current sensing means 120 may e.g. be implemented as a current mirror, which mirrors and possibly amplifies the current through the high side switch 112. The sensed current $I_{sns}$ 160 (also referred to herein as the sensed current signal) provided by the current sensing means 120 is therefore typically proportional (or equal) to the current through the high side switch 112 (and to the current through the inductor 113, when the high side switch is in its on-state). At 100% duty cycle of the buck converter 110 and in stable operation, the current through the high side switch 112 is typically constant and corresponds to the input voltage $V_{in}$ 154 divided by the impedance of the load 201 of the system 100.

Figure 3:
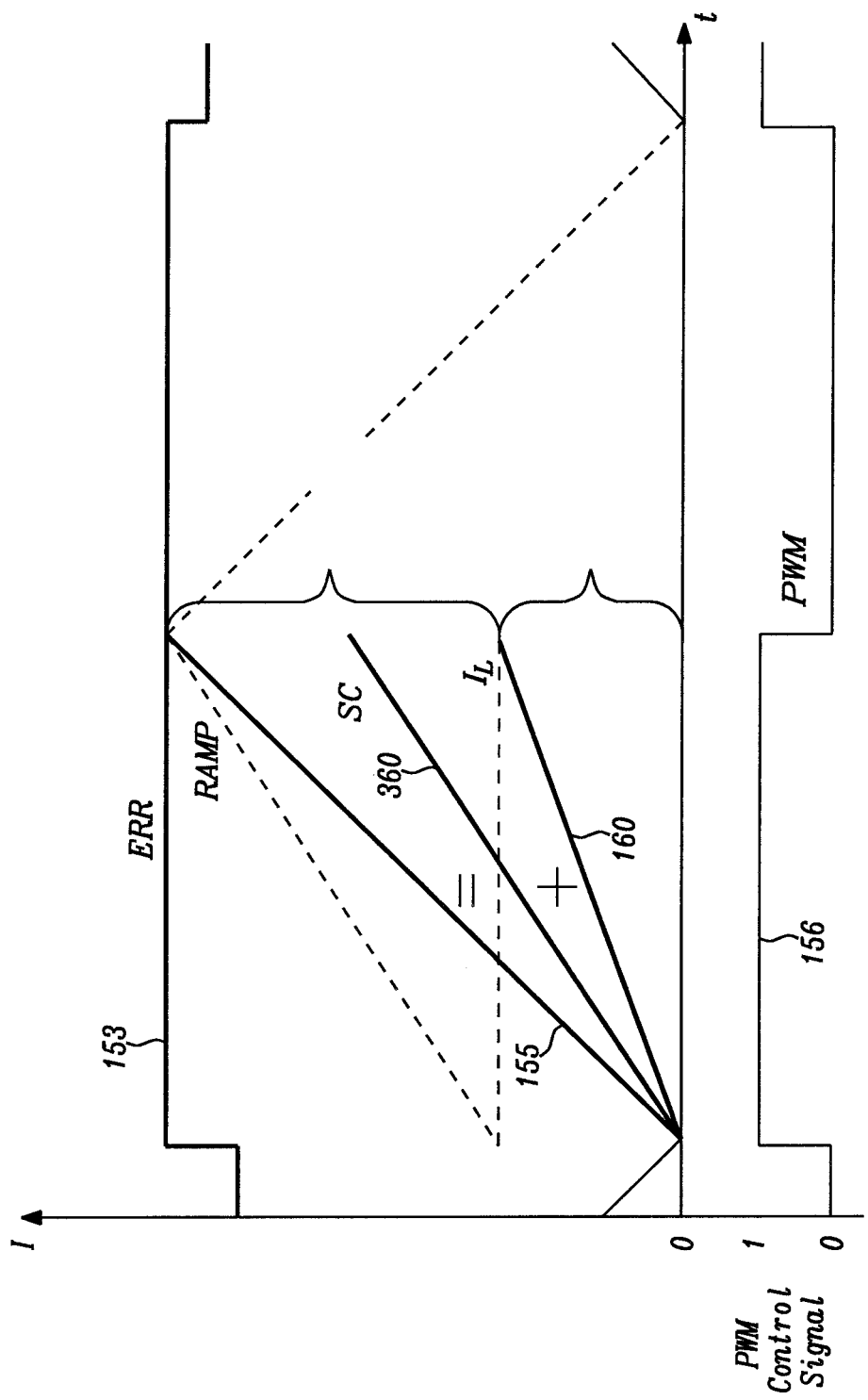
FIG. 3 illustrates the generation of a PWM signal for the determination of the duty cycle of a magnetizing (e.g. high side) switch.

The sensed current Isns 160 may be added in addition unit 117 to a saw wave signal (also referred to herein as a slope compensation signal) having the cycle length of the buck converter 110. The adding unit 117 may further convert the sum of the saw wave signal and the sensed current $I_{sns}$ 160 into the saw wave voltage $V_{isns}$ 155 (i.e. the ramp signal). The saw wave signal may be generated by a saw wave generator 116 (comprising e.g. a switch (e.g. a transistor) in parallel to a capacitor). Overall, the saw wave generator 116 and the adding unit 117 provide the saw wave voltage $V_{isns}$ 155 which comprises a periodic saw wave signal (generated by the saw wave generator 116) that is offset by a voltage derived from the sensed current $I_{sns}$ 160. As indicated above, $I_{sns}$ 160 is a constant current in case of stable operation of the buck converter 110 at 100% duty cycle. In such cases, the saw wave voltage $V_{isns}$ 155 corresponds to the periodic saw wave signal offset by a constant voltage derived from the constant current $I_{sns}$ 160. In case of a duty cycle lower than 100%, the sensed current $I_{sns}$ 160 is zero when the high side switch 112 is in off-state and has a saw like rising shape when the high side switch 112 is in on-state. The saw like rising shape of the sense current $I_{sns}$ 160 during the on-state of the high side switch 112 results from the current throttling properties of the inductor 113. Hence, in cases of a duty cycle of less than 100%, the saw wave voltage $V_{isns}$ 155 (i.e. the ramp signal) is obtained as an overlay of the periodic saw wave signal and an intermittent saw shaped voltage derived from the sensed current $I_{sns}$ 160. This is illustrated in FIG. 3, which shows the saw wave voltage $V_{isns}$ or RAMP signal 155 as a sum of the sensed current $I_{sns}$ or $I_L$ 160 and the periodic saw wave signal SC 360.

In the system 100 of FIG. 1, the saw wave voltage $V_{isns}$ 155 is compared to the error voltage $V_{error}$ 153 to generate the pulse width modulated (PWM) control signal 156 for the driver and controller 115 of the buck converter 110. As illustrated in FIG. 3, the PWM control signal 156 exhibits an edge, when the saw wave voltage 155 reaches and/or exceeds the error voltage ERR 153.

In the context of a current control mode (CMC), it is desirable to control the current through the HS switch 112 and/or through the inductor 113. In particular, it may be desirable to set a target peak current for the current through the HS switch 112 and to control the system 100 such that the maximum current through the HS switch 112 corresponds to the target peak current.

Due to the fact that the sensed current 160 (i.e. more generally a sensed current signal) is combined with a saw wave current 360 (i.e. more generally with a slope compensation signal), the system 100 of FIG. 1 may not be enabled to set a pre-determined target peak current. As illustrated in FIG. 3, starting from a stable (compensated) current loop, the RAMP signal 155 can be split into a uniquely defined and controlled slope compensation signal 360 and the sensed current signal $I_L$ 160. If the RAMP signal 155 has reached or exceeds the ERR signal 153 the PWM comparator 118 switches, thereby providing a PWM control signal 156 for controlling the power switches 111, 112. The control unit 115 may be configured to determine the duty cycle based on the PWM control signal 156.

Figure 2:
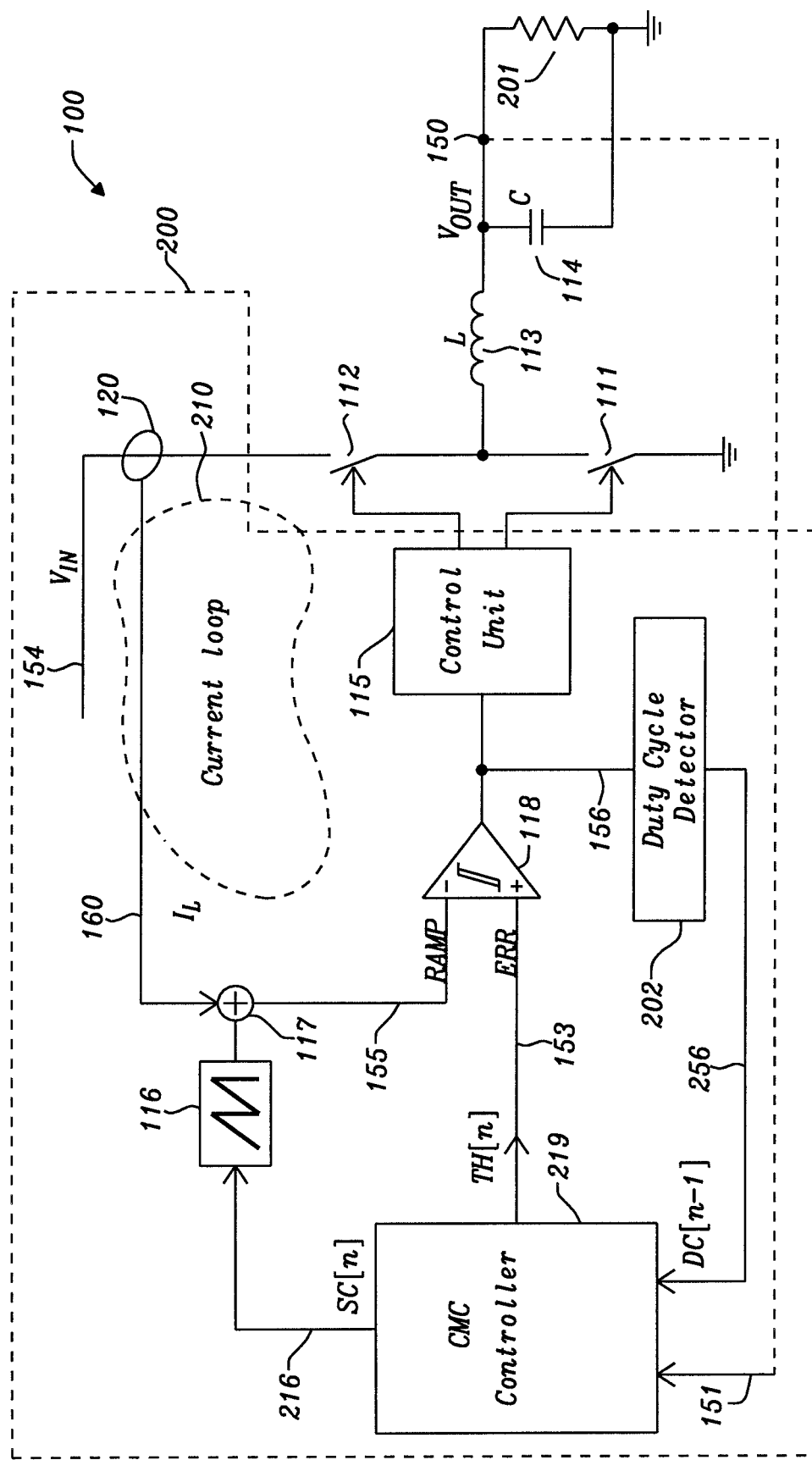
FIG. 2 shows a power converter comprising a duty cycle feedback.

The system 100 may comprise, as illustrated in FIG. 2, a CMC controller 219 (also referred to herein as control circuitry), which is configured to determine the error signal 153 based on the duty cycle 256 of the HS switch 112. A duty cycle detector 202 may be used for detecting the duty cycle 256 based on the PWM control signal 153.

In an example, the slope compensation signal 360 may have a slope 216 given by $SC_{RAMP}$=1.25 A/s, i.e. the slope compensation signal 360 may rise with 1.25 A per second. The temporal length of a commutation cycle, i.e. the cycle length, may be $T_{SW}$=1s, and the duty cycle within the preceding commutation cycle may be DC(n-1)=0.5. The ERR or ramp signal 153 may be given by $$RAMP_{@switching\ threshold}=ERR=1A$$

An edge of the PWM control signal 156 is generated if the following condition is met $$RAMP_{@switching\ threshold}=ERR=SC_{@switching\ threshold}+I_{L@switching\ threshold}$$

wherein $I_{L@switching\ threshold}$ is the sensed current signal 160 at which the edge of the PWM control signal 156 is generated, i.e. the peak current $I_{Lpcak}$ through the HS switch 112. $SC_{@switching\ threshold}$ is the value of the slope compensation signal 360, at which the edge of the PWM control signal 156 is generated.

The peak current through the HS switch 112 for the above example may then be calculated as follows:

$$1A = SC_{@switching\ threshold} + I_{L@switching\ threshold}$$

$$I_{L@switching\ threshold} = 1A - SC_{RAMP} * DC * T_{SW}$$

$$I_{L@switching\ threshold} = I_{L_{PEAK}}$$

$$I_{L_{PEAK}} = 1A - SC_{RAMP} * DC * T_{SW}$$

$$I_{L_{PEAK}} = 1A - 1.25\frac{A}{s} * 0.5 * 1s$$

$$I_{L_{PEAK}} = 0.375A$$

It can be seen that the peak current through the HS switch 112 or the inductor 113 depends on the duty cycle DC 256 and on the ERR signal 153 (which is assumed to be 1A).

The CMC controller 219 may be configured to adapt the ERR signal 153 (i.e. the threshold signal) for a commutation cycle n, based on the duty cycle DC(n-1) 256 of the directly preceding commutation cycle n-1. In particular, the ERR signal 153 may be determined such that the peak current through the HS switch 112 is regulated to a target peak current.

By way of example, $I_{L,peak}$(n-1) corresponds to the actual peak current through the HS switch 112 and $I_{ERR}$(n-1) corresponds to the actual ERR signal 153 of the preceding commutation cycle n-1, with $$I_{L,peak}(n-1)=I_{ERR}(n-1)-SC_{RAMP}(n-1)*DC(n-1)*T_{SW}$$

$I_{L,p}$ corresponds to the target peak current and $\Delta_1=I_{L,peak}$(n-1)-$I_{L,p}$ corresponds to the deviation of the actual peak current $I_{L,peak}$(n-1) from the target peak current $I_{L,p}$. By offsetting the ERR signal 153 with the deviation $\Delta_1$, i.e. by setting $I_{ERR}(n) \leftarrow I_{ERR}(n-1)-\Delta_1$ it may be achieved that the actual peak current in the following commutation cycle n, i.e. $I_{L,peak}$(n), corresponds to the target peak current $I_{L,p}$, if all other conditions remain unchanged. The deviation $\Delta_1$ may be referred to as a current offset.

Alternatively or in addition, the slope 216 $SC_{RAMP}$(n) of the slope compensation signal 360 for the commutation cycle n may be adapted in dependence of the duty cycle DC(n-1) of the preceding commutation cycle n-1. By way of example, the slope $SC_{RAMP}$(n) may be offset by a slope offset $\Delta_s$ such that $$I_{L,p}=I_{ERR}(n-1)-[(SC]_{RAMP}(n-1)+\Delta_s)*DC(n-1)*T_{SW}$$

$$I_{L,p}=I_{L,peak}(n=1)-\Delta_s*DC(n-1)*T_{SW}$$

$$\Delta_s*DC(n-1)*T_{SW}=\Delta_1$$

The slope $SC_{RAMP}$(n) 216 may be determined as $SC_{RAMP}(n)=SC_{RAMP}(n-1)+\Delta_s$.

Hence, the CMC controller 219 may be configured to adapt the slope 216 of the slope compensation signal 360 and/or the error signal 153 for a commutation cycle n, based on the duty cycle DC(n-1) to adapt the actual peak current through the HS switch 112 (which is indicated by the sensed current 160) in accordance to a target peak current $I_{L,p}$. By doing this, the peak current control can be improved.

The ability to tightly control the peak current enables the possibility to close a coil over current control loop within the described current loop 210. Hence, only a single current sensing output is required and it is ensured that the loop remains always closed. Circuitry such as a coil over current comparator are not required. Hence, an efficient peak current mode control scheme is provided.

As illustrated in FIG. 2, the current loop 210 is closed using a current sensing unit 120 and an artificially added slope compensation signal 360 (SC) (using circuitry 116, 117), wherein the artificially added slope compensation signal 360 may be used to avoid subharmonics instability in a DC/DC power converter operating in CCM (continuous conduction mode) and at duty cycles above 50%. A ramp signal RAMP 155 is formed, compared to the error signal 155 at the PWM comparator 118 and a duty cycle 256 is determined.

The duty cycle detector 202 may translate the duty cycle information DC[n-1] and feeds it back to the peak current mode controller (PCMC) 219 which recalculates the new peak current threshold, i.e. the new threshold signal TH[n] 153, also referred to as error signal.

This interaction is performed repeatedly, cycle by cycle, and operates substantially faster compared to the output voltage loop control for regulating the output voltage 150. It should be noted that typically both, the peak current mode controller (described in the present document) and the voltage regulator (using the feedback voltage 151), have control over the threshold signal TH[n] 153.

Figure 4:
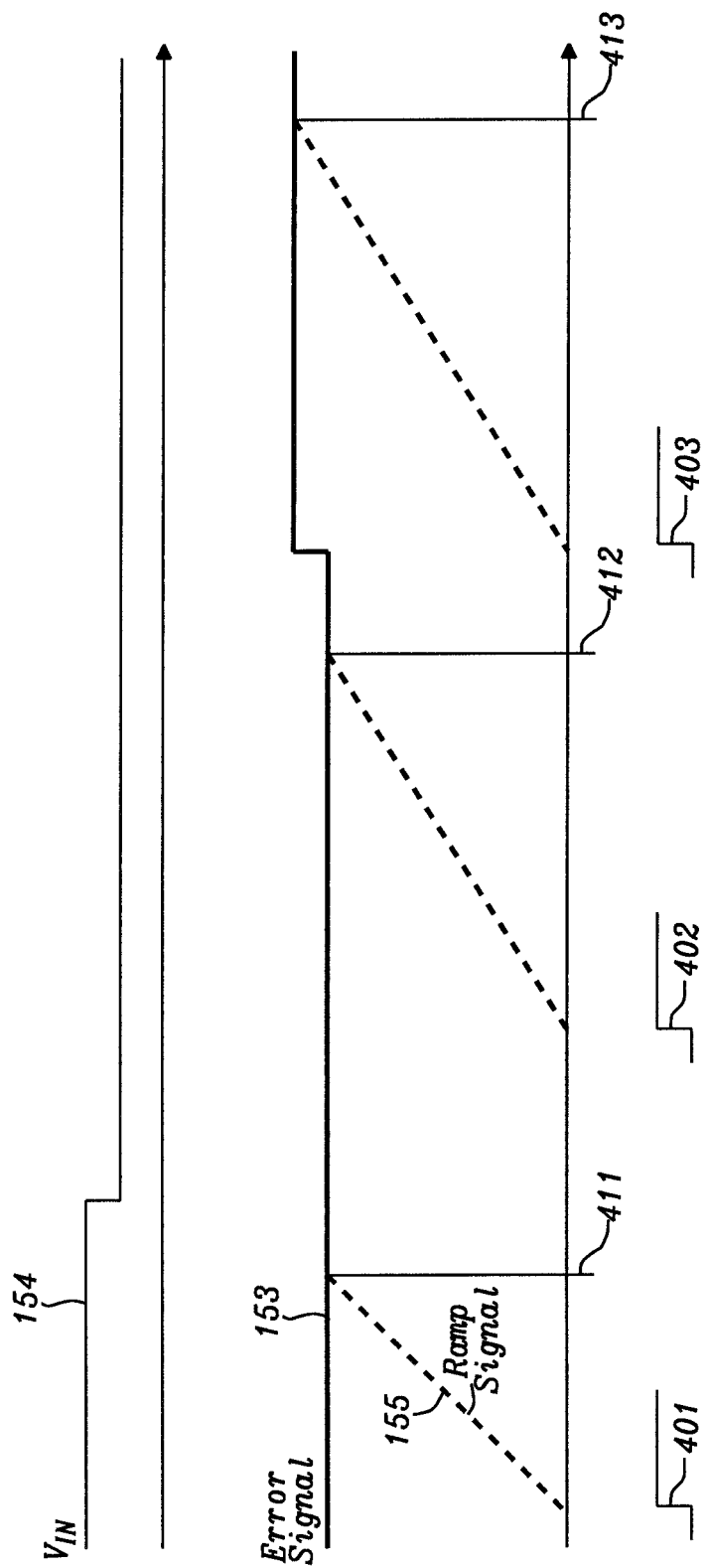
FIG. 4 shows measurement signals of a control loop which comprises a duty cycle feedback.

FIG. 4 shows example measurement signals of a system 100. During the first cycle 401, the system 100 operates at constant external supply conditions (e.g. at a constant input voltage 154) and hence at a constant duty cycle 256 (indicated by the edge 411 of the PWM control signal 156).

After a significant, measureable and abrupt change of the external supply condition (in the illustrated example this is an input voltage step down; but the perturbation can also be an output voltage change or a perturbation with a similar effect on the duty cycle 256), the switching cycle 402 results in an increased duty cycle 256 (i.e. a delayed edge 412 of the PWM signal 156). This may also result in an decreased peak current through the HS switch 112. As outlined above, the peak current $I_{L,peak}$ is given by the formula:

$$I_{L,peak}(n-1) = I_{ERR}(n-1) - SC_{RAMP}(n-1) * DC(n-1) * T_{SW}$$

Hence, an increase of the duty cycle DC with unchanged $I_{ERR}$ lead to a decreased peak current $I_{L,peak}$.

The duty cycle DC(n−1) of the cycle 402 may be used to offset the error signal 153 for the next cycle 403, thereby adapting (notably increasing) the error signal 153. As a result of this, the edge 413 of the PWM signal 156 is moved backward, thereby further increasing the duty cycle DC(n). Furthermore, the peak current through the magnetizing switch 112 is kept constant compared to commuting cycle 401, thereby enabling a tight peak current control. The control scheme described in the context of FIG. 4 may be used to control a constant target peak current. The control scheme is described under the assumption that the output voltage loop is not acting.

As outlined above, the slope compensation signal 360 (SC) may be adapted cycle by cycle. In particular, the slope SC(n) 216 of the slope compensation signal 360 may be adapted in dependence of the level of the peak current through the magnetizing (e.g. HS) switch 112. The slope compensation signal 360 may be adapted in accordance to the range of the inductor current. By doing this, the signal to noise ratio (SNR) of the RAMP signal 155 can be improved. By way of example, the ratio of the slope compensation signal 360 and the sensed current signal 160 may be kept constant or may be adaptable. By doing this, noise immunity may be improved.

Figure 5:
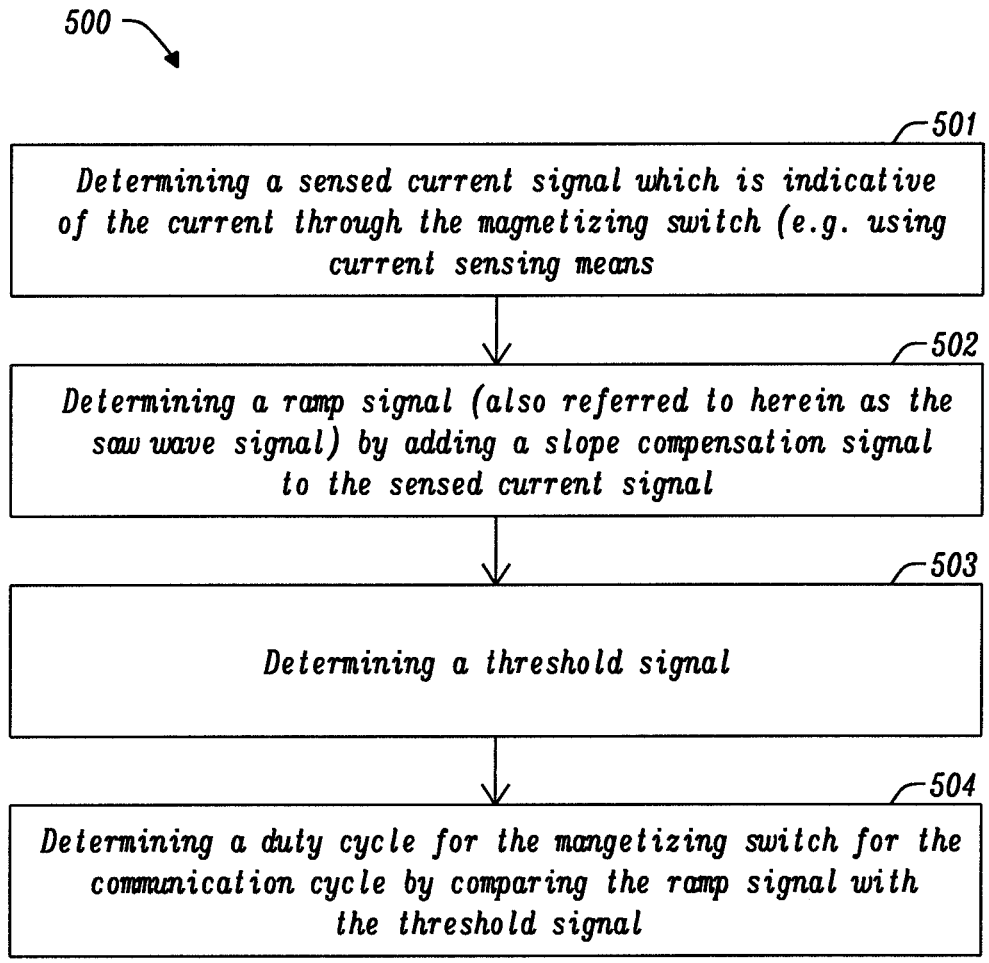
FIG. 5 shows a flow chart of an example method for adapting the duty cycle of a power switch of a switched-mode power converter.

FIG. 5 shows a flow chart of an example method 500 for controlling the duty cycle of a magnetizing switch (e.g. a high side switch) 112 forming a serial arrangement with a demagnetizing switch (e.g. a low side switch) 111. The serial arrangement may be part of a switched-mode power converter 100 (e.g. of a system 100 as shown in FIGS. 1 and 2). The magnetizing switch 112 and the demagnetizing switch 111 are switched on, within a sequence of commutation cycles 401, 402, 403, in a mutually exclusive manner, wherein the duration of the commutation cycles 401, 402, 403 may be fixed and constant.

The method 500 comprises, within a commutation cycle 403 from the sequence of commutation cycles 401, 402, 403, determining 501 a sensed current signal 160 which is indicative of the current through the magnetizing switch 112 (e.g. using current sensing means 120). It should be noted that the "signals" in this document may be currents and/or voltages.

Furthermore, the method 500 comprises determining 502 a ramp signal 155 (also referred to herein as the saw wave signal) by adding a slope compensation signal 360 to the sensed current signal 160. In addition, the method 500 comprises determining 503 a threshold signal 153. The threshold signal 153 (also referred to herein as error signal) may be determined using a feedback loop for regulating the output voltage 150 of a switched-mode power converter 100.

In addition, the method 500 comprises determining 504 a duty cycle 256 for the magnetizing switch 112 for the commutation cycle 403 by comparing the ramp signal 155 with the threshold signal 153. This may be achieved using a comparator 118. The output of the comparator 118 may be a PWM control signal 153, wherein the edges of the PWM signal 153 may be used to determine the duty cycle 256.

The threshold signal 153 and/or the slope compensation signal 360 depend on the duty cycle 256 for the magnetizing switch 112 of a preceding commutation cycle 402 (notably of a directly preceding cycle 402) from the sequence of commutation cycles 401, 402, 403. In particular, the duty cycle 256 of the preceding communication cycle 402 may be used to directly adjust or offset the threshold signal 153 and/or the slope compensation signal 360 (notably a slope 256 of the slope compensation signal 360). The adjustment or offsetting may be performed separately from a regulating feedback loop (notably separately from the feedback signal 151 which is used to regulate the output voltage 150).

By doings this, a precise and reliable peak current control of the peak current through the magnetizing switch 112 may be performed (e.g. while at the same time regulating the output voltage 150 of a switched-mode power converter 100 in accordance to a target voltage 152).

As such, control circuitry 200 (comprising the CMC controller 219) for controlling the current through a magnetizing switch 112 which is arranged in series with a demagnetizing switch 111 is described. The magnetizing switch 112 and the demagnetizing switch 111 are switched on within a sequence of commutation cycles 401, 402, 403 in a mutually exclusive manner, e.g. for transferring power from an input port to an output port of a system 100, notably of a switched-mode power converter 100. The magnetizing switch 112 may be configured to magnetize and/or the demagnetizing switch 111 may be configured to demagnetize an inductor 113 which is coupled to a midpoint between the magnetizing switch 112 and the demagnetizing switch 111.

The control circuitry 200 is configured, within a (notably within any) commutation cycle 403 from the sequence of commutation cycles 401, 402, 403, to determine a sensed current signal 160 which is indicative of a current through the magnetizing switch 112. The midpoint between the magnetizing switch 112 and the demagnetizing switch 111 (which may form a half bridge) may be coupled to an inductor 113, wherein the inductor 113 may be coupled to the input port or to the output port of the system 100. As such, the current through the magnetizing switch 112 may ramp up, wherein the slope of the ramp up typically depends on the inductance of the inductor 113. Using current sensing means 120, the current through the magnetizing switch 112 may be sensed during the commutation cycle 403 (notably during the portion of the commutation cycle 403, during which the magnetizing switch 112 is closed, i.e. switched on).

The control circuitry 200 is configured to determine a ramp signal 155 by adding a slope compensation signal 360 to the sensed current signal 160. The slope compensation signal 360 is typically ramped up starting from a minimum value (e.g. zero) at the beginning of a commutation cycle 401, 402, 403 to a maximum value at the end of a commutation cycle 401, 402, 403. The maximum value depends on the slope 216 of the slope compensation signal 360. By adding a slope compensation signal 360, the stability of a control scheme for a magnetizing switch 112 (and for a demagnetizing switch 111 which is controlled in a complementary manner (e.g. in a passive and/or automatic manner, e.g. using a diode)) may be increased (notably for duty cycles 256 which are greater than 50% of the cycle length of a commutation cycle 401, 402, 403).

The control circuitry 200 is further configured to determine a threshold signal 153. As indicated above, the serial arrangement of the magnetizing switch 112 and the demagnetizing switch 111 (e.g. the half bridge) may be part of a switched-mode power converter 100 and the power converter 100 may comprise a feedback loop feeding back a feedback voltage 151 derived from the output voltage 150 of the power converter 100. The feedback voltage 151 may be used to regulate the output voltage 150 of the power converter 100 in accordance to a target voltage 152. For this purpose, the threshold voltage 153 may depend on the feedback voltage 151, notably on a deviation of the feedback voltage 151 from the target voltage 152. The power converter 100 may comprise a buck converter, a boost converter or a buck-boost converter or any other DC/DC power converter.

In particular, the midpoint of the serial arrangement of the magnetizing switch 112 and the demagnetizing switch 111 may be coupled to an output port or an input port (of the switched-mode power converter 100) via an inductor 113. Furthermore, the magnetizing switch 112 and the demagnetizing switch 111 may be arranged between a high or HS potential 150, 154 and a low or LS potential, wherein the high potential 150, 154 may correspond to an input voltage 154 at the input port (of the power converter 100) or to an output voltage 150 at the output port (of the power converter 100). The threshold voltage 153 may depend on a deviation of the feedback voltage 151 (which is derived from the output voltage 150 at the output port) from a target voltage 152. As such, the threshold voltage 153 may be used to regulate the output voltage 150 of a power converter 100 in accordance to a target voltage 152.

The control circuitry 200 (notably the comparator 118) is further configured to determine a duty cycle 256 for the magnetizing switch 112 for the commutation cycle 403 by comparing the ramp signal 155 with the threshold signal 153. In particular, a PWM control signal 156 may be determined, wherein the PWM control signal 156 takes on a first value if the ramp signal 155 is smaller than the threshold signal 153, and wherein the PWM control signal 156 takes on a second value if the ramp signal 155 is greater than the threshold signal 153. An edge of the PWM control signal 156 within a commutation cycle 401, 402, 403 may be used to determine the duty cycle 246 of the magnetizing switch 112 for this commutation cycle 401, 402, 403. The demagnetizing switch 111 may be switched in an opposed manner to the magnetizing switch 112, i.e. the demagnetizing switch 111 may be switched on, when the magnetizing switch 112 is switched off, and vice versa.

The threshold signal 153 and/or the slope compensation signal 360 (for the commutation cycle 403) depend on the duty cycle 256 for the magnetizing switch 112 of a preceding commutation cycle 402 from the sequence of commutation cycles 401, 402, 403. In other words, the threshold signal 153 TH(n) and/or the slope compensation signal SC(n) for the commutation cycle n depend on the duty cycle DC(n−1) of the preceding commutation cycle n−1. In particular, the threshold signal 153 and/or the slope compensation signal 360 may be directly adapted or offset (without going through the feedback loop provided by the sensed current signal 160 and/or the feedback voltage 151) in a commutation cycle n, based on the duty cycle 256 of the magnetizing switch 112 of the preceding commutation cycle (e.g. n−1). By doing this, a reliable and tight control of the peak current through the magnetizing switch 112 may be performed.

Hence, the control circuitry 200 may be configured to adjust the threshold signal 153 and/or the slope compensation signal 360 for the commutation cycle 403 (e.g. using an offset) directly based on the duty cycle 256 for the magnetizing switch 112 of the preceding commutation cycle 402, separately from a feedback loop provided by the sensed current signal 160 and/or separately from an output voltage 150, which is formed or generated (e.g. regulated) by the serial arrangement of the magnetizing switch 112 and the demagnetizing switch 111. In particular, an offset may be determined directly (e.g. using digital processing and/or using analog circuitry) from the duty cycle 256 for the magnetizing switch 112 of the preceding commutation cycle 402. This offset may be used to offset an error signal 153 derived via a feedback loop. The offset error signal 153 may then be used as the threshold signal 153 for the commutation cycle 403.

The control circuitry 200 may be configured to adapt the threshold signal 153 and/or the slope compensation signal 360 (notably the slope 216 of the slope compensation signal 360) based on a target peak current $I_{L,p}$ for the current through the magnetizing switch 112. In particular, the control circuitry 200 may be configured to adapt the threshold signal 153 and/or the slope compensation signal 360 (notably the slope 216 of the slope compensation signal 360) to regulate the maximum current through the magnetizing switch 112 during the sequence of commutation cycles 401, 402, 403 (notably during each of the commutation cycles 401, 402, 403) to the target peak current $I_{L,p}$. For this purpose, the threshold signal 153 and/or the slope compensation signal 360 may be adapted and or offset based on the duty cycle 256 for the magnetizing switch 112 of a preceding commutation cycle 402, repeatedly, on a cycle-per-cycle basis. Hence, a precise and tight peak current control may be achieved.

The control circuitry 200 may be configured to determine the maximum current through the magnetizing switch 112 during the preceding commutation cycle 402, based on the slope 216 of the slope compensation signal 360 during the preceding commutation cycle 402 and based on the duty cycle 256 for the magnetizing switch 112 of the preceding commutation cycle 402. Typically, the slope 216 may be multiplied with the duty cycle 256 (wherein the duty cycle 256 may indicate the on-time of the magnetizing switch 112 as a percentage of the cycle length) to determine a maximum value of the slope compensation signal 360 during the preceding commutation cycle 402. For this purpose, the cycle length may also be taken into consideration (e.g. as a further multiplication factor). This maximum value may be subtracted from the threshold signal 153 for the preceding commutation cycle 402, thereby providing the maximum current through the magnetizing switch 112 during the preceding commutation cycle 402. Hence, by considering the duty cycle 256 for the magnetizing switch 112 of the preceding commutation cycle 402, the maximum current through the magnetizing switch 112 may be determined in a precise manner, thereby enabling a precise peak current control.

The control circuitry 200 may be configured to determine a deviation of the maximum current through the magnetizing switch 112 during the preceding commutation cycle 402 from the target peak current $I_{L,p}$. This deviation may be determined based on the sensed current signal 160 during the preceding commutation cycle 402. The threshold signal 153 and/or the (slope 216 of the) slope compensation signal 360 may be adapted based on the deviation, in order to allow for a precise peak current control.

The control circuitry 200 may be configured to adapt the threshold signal 153 and/or the (slope 216 of the) slope compensation signal 360, such that if the adapted threshold signal 153 and/or the adapted (slope 216 of the) slope compensation signal 360 had been used during the preceding commutation cycle 402, the maximum current through the magnetizing switch 112 during the preceding commutation cycle 402 would have been equal to or within a predetermined range from (e.g. within 10% of) the target peak current $I_{L,p}$. Hence, a precise peak current control may be performed.

The control circuitry 200 may be configured to reduce the threshold signal 153 for the commutation cycle 403 by a current offset, if the maximum current through the magnetizing switch 112 during the preceding commutation cycle 402 exceeded the target peak current. Alternatively or in addition, the control circuitry 200 may be configured to increase the threshold signal 153 for the commutation cycle 403 by a current offset, if the maximum current through the magnetizing switch 112 during the preceding commutation cycle 402 did not reach the target peak current. The current offset preferably depends on or is calculated directly using the duty cycle 256 for the magnetizing switch 112 of the preceding commutation cycle 402.

Alternatively or in addition, the control circuitry 200 may be configured to increase the slope 216 of the slope compensation signal 360 for the commutation cycle 403 by a slope offset, if the maximum current through the magnetizing switch 112 during the preceding commutation cycle 402 exceeded the target peak current. Alternatively or in addition, the control circuitry 200 may be configured to reduce the slope 216 of the slope compensation signal 360 for the commutation cycle 403 by a slope offset, if the maximum current through the magnetizing switch 112 during the preceding commutation cycle 402 did not reach the target peak current. The slope offset typically depends on or is calculated directly using the duty cycle 256 for the magnetizing switch 112 of the preceding commutation cycle 402.

The control circuitry 200 may be configured to adapt the slope 216 of the slope compensation signal 360 and the threshold signal 153 for the commutation cycle 403 based on the maximum current through the magnetizing switch 112 during the preceding commutation cycle 402. In particular, the control circuitry 200 may be configured to adapt the slope 216 of the slope compensation signal 360 based on a target ratio of the maximum value of the slope compensation signal 360 and the maximum current through the magnetizing switch 112. The slope 216 of the slope compensation signal 360 may be adjusted such that the target ratio is met for the sequence of commutation cycles 401, 402, 403. By doing this noise immunity of a system 100 comprising the serial arrangement of the magnetizing switch 112 and the demagnetizing switch 111 may be increased.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. Control circuitry for controlling the duty cycle of a magnetizing switch being arranged in series with a demagnetizing switch; wherein, within a commutation cycle from a sequence of commutation cycles, the control circuitry is configured to
    determine a sensed current signal indicative of a current through the magnetizing switch;
    determine a threshold signal;
    determine a slope compensation signal;
    detect a duty cycle for the magnetizing switch of a preceding commutation cycle from the sequence of commutation cycles;
    adjust the threshold signal or the slope compensation signal for the commutation cycle directly based on the detected duty cycle for the magnetizing switch of the preceding commutation cycle;
    determine, if the threshold signal was adjusted, a ramp signal by adding the slope compensation signal to the sensed current signal;
    determine, if the threshold signal was adjusted, a duty cycle for the magnetizing switch for the commutation cycle by comparing the ramp signal with the adjusted threshold signal;
    determine, if the slope compensation signal was adjusted, an adjusted ramp signal by adding the adjusted slope compensation signal to the sensed current signal, and
    determine, if the slope compensation signal was adjusted, the duty cycle for the magnetizing switch for the commutative cycle by comparing the threshold signal with the adjusted ramp signal.

2. Control circuitry according to claim 1, wherein the control circuitry is configured to adjust the threshold signal and/or the slope compensation signal based on a target peak current for the current through the magnetizing switch.

3. Control circuitry according to claim 2, wherein the control circuitry is configured to adjust the threshold signal or the slope compensation signal to regulate a maximum current through the magnetizing switch during the sequence of commutation cycles to the target peak current.

4. Control circuitry according to claim 3, wherein the control circuitry is configured to determine the maximum current through the magnetizing switch during the preceding commutation cycle based on a slope of the slope compensation signal during the preceding commutation cycle and based on the duty cycle for the magnetizing switch of the preceding commutation cycle.

5. Control circuitry according to claim 1, wherein the control circuitry is configured to
    determine a deviation of a maximum current through the magnetizing switch during the preceding commutation cycle from a target peak current, based on the sensed current signal during the preceding commutation cycle; and
    adjust the threshold signal or the slope compensation signal based on the deviation.

6. Control circuitry according to claim 5, wherein the control circuitry is configured to
    reduce the threshold signal for the commutation cycle by a current offset, if the maximum current through the magnetizing switch during the preceding commutation cycle exceeded the target peak current; and/or increase the threshold signal for the commutation cycle by a current offset, if the maximum current through the magnetizing switch during the preceding commutation cycle did not reach the target peak current; wherein the current offset depends on the duty cycle for the magnetizing switch of the preceding commutation cycle.

7. Control circuitry according to claim 5, wherein the control circuitry is configured to increase a slope of the slope compensation signal for the commutation cycle by a slope offset, if the maximum current through the magnetizing switch during the preceding commutation cycle exceeded the target peak current; and/or reduce the slope of the slope compensation signal for the commutation cycle by a slope offset, if the maximum current through the magnetizing switch during the preceding commutation cycle did not reach the target peak current; wherein the slope offset depends on the duty cycle for the magnetizing switch of the preceding commutation cycle.

8. Control circuitry according to claim 1, wherein the control circuitry is configured to adjust the threshold signal or the slope compensation signal, such that if the adjusted threshold signal and/or the slope compensation signal had been used during the preceding commutation cycle, the maximum current through the magnetizing switch during the preceding commutation cycle would have been equal to or within a predetermined range from the target peak current.

9. Control circuitry according to claim 1, wherein the slope compensation signal is ramped up starting from a minimum value at a beginning of a commutation cycle to a maximum value at an end of a commutation cycle; and the maximum value depends on a slope of the slope compensation signal.

10. Control circuitry according to claim 9, wherein the control circuitry is configured to adjust the slope of the slope compensation signal and the threshold signal for the commutation cycle based on a maximum current through the magnetizing switch during the preceding commutation cycle.

11. Control circuitry according to claim 10, wherein the control circuitry is configured to adjust the slope of the slope compensation signal based on a target ratio of the maximum value of the slope compensation signal and the maximum current through the magnetizing switch.

12. Control circuitry according to claim 1, wherein a midpoint between the magnetizing switch and the demagnetizing switch is coupled to an output port or an input port via an inductor;

the magnetizing switch and the demagnetizing switch are arranged between a high potential and a low potential;

the high potential corresponds to an input voltage at the input port or to an output voltage at the output port; and the threshold voltage depends on a deviation of a feedback voltage derived from the output voltage at the output port from a target voltage.

13. Control circuitry according to claim 1, wherein the magnetizing switch and the demagnetizing switch are part of a switched-mode power converter; and the power converter comprises a feedback loop feeding back a feedback voltage derived from an output voltage of the power converter; and the threshold voltage depends on the feedback voltage.

14. Control circuitry according to claim 1, wherein the control circuitry is configured to adjust the threshold signal and/or the slope compensation signal for the commutation cycle directly based on the detected duty cycle for the magnetizing switch of the preceding commutation cycle, separately from a feedback loop provided by the sensed current signal and/or an output voltage.

15. A method for controlling the duty cycle of a magnetizing switch which is arranged in series with a demagnetizing switch; wherein, within a commutation cycle from a sequence of commutation cycles, the method comprises determining a sensed current signal indicative of a current through the magnetizing switch;

determining a threshold signal;

determining a slope compensation signal;

detecting a duty cycle for the magnetizing switch of a preceding commutation cycle from the sequence of commutation cycles;

adjusting the threshold signal or the slope compensation signal for the commutation cycle directly based on the detected duty cycle for the magnetizing switch of the preceding commutation cycle;

determining, if the threshold signal was adjusted, a ramp signal by adding the slope compensation signal to the sensed current signal;

determining, if the threshold signal was adjusted, a duty cycle for the magnetizing switch for the commutation cycle by comparing the ramp signal with the adjusted threshold signal;

determining, if the slope compensation signal was adjusted, an adjusted ramp signal by adding the adjusted slope compensation signal to the sensed current signal, and determining, if the slope compensation signal was adjusted, the duty cycle for the magnetizing switch for the commutative cycle by comparing the threshold signal with the adjusted ramp signal.

16. The method according to claim 15, wherein the control circuitry is configured to adjust the threshold signal or the slope compensation signal based on a target peak current for the current through the magnetizing switch.

17. The method according to claim 16, wherein the control circuitry is configured to adjust the threshold signal or the slope compensation signal to regulate a maximum current through the magnetizing switch during the sequence of commutation cycles to the target peak current.

18. The method according to claim 15, wherein the control circuitry is configured to determine a deviation of a maximum current through the magnetizing switch during the preceding commutation cycle from a target peak current, based on the sensed current signal during the preceding commutation cycle; and adjust the threshold signal or the slope compensation signal based on the deviation.

19. The method according to claim 18, wherein the control circuitry is configured to reduce the threshold signal for the commutation cycle by a current offset, if the maximum current through the magnetizing switch during the preceding commutation cycle exceeded the target peak current; and/or increase the threshold signal for the commutation cycle by a current offset, if the maximum current through the magnetizing switch during the preceding commutation cycle did not reach the target peak current; wherein the current offset depends on the duty cycle for the magnetizing switch of the preceding commutation cycle.

20. The method according to claim 18, wherein the control circuitry is configured to increase a slope of the slope compensation signal for the commutation cycle by a slope offset, if the maximum current through the magnetizing switch during the preceding commutation cycle exceeded the target peak current; and/or reduce the slope of the slope compensation signal for the commutation cycle by a slope offset, if the maximum current through the magnetizing switch during the preceding commutation cycle did not reach the target peak current; wherein the slope offset depends on the duty cycle for the magnetizing switch of the preceding commutation cycle.

21. The method according to claim 15, wherein the control circuitry is configured to adjust the threshold signal or the slope compensation signal, such that if the adjusted threshold signal and/or the slope compensation signal had been used during the preceding commutation cycle, the maximum current through the magnetizing switch during the preceding commutation cycle would have been equal to or within a predetermined range from the target peak current.

22. The method according to claim 21, wherein the control circuitry is configured to determine the maximum current through the magnetizing switch during the preceding commutation cycle based on a slope of the slope compensation signal during the preceding commutation cycle and based on the duty cycle for the magnetizing switch of the preceding commutation cycle.

23. The method according to claim 15, wherein
the slope compensation signal is ramped up starting from a minimum value at a beginning of a commutation cycle to a maximum value at an end of a commutation cycle; and
the maximum value depends on a slope of the slope compensation signal.

24. The method according to claim 23, wherein the control circuitry is configured to adjust the slope of the slope compensation signal and the threshold signal for the commutation cycle based on a maximum current through the magnetizing switch during the preceding commutation cycle.

25. The method according to claim 24, wherein the control circuitry is configured to adjust the slope of the slope compensation signal based on a target ratio of the maximum value of the slope compensation signal and the maximum current through the magnetizing switch.

26. The method according to claim 15, wherein
a midpoint between the magnetizing switch and the demagnetizing switch is coupled to an output port or an input port via an inductor;
the magnetizing switch and the demagnetizing switch are arranged between a high potential and a low potential;
the high potential corresponds to an input voltage at the input port or to an output voltage at the output port; and
the threshold voltage depends on a deviation of a feedback voltage derived from the output voltage at the output port from a target voltage.

27. The method according to claim 15, wherein
the magnetizing switch and the demagnetizing switch are part of a switched-mode power converter, and
the power converter comprises a feedback loop feeding back a feedback voltage derived from an output voltage of the power converter; and
the threshold voltage depends on the feedback voltage.

28. The method according to claim 15, wherein the control circuitry is configured to
adjust the threshold signal and/or the slope compensation signal for the commutation cycle directly based on the duty cycle for the magnetizing switch of the preceding commutation cycle, separately from a feedback loop provided by the sensed current signal and/or an output voltage.

* * * * *